(12) United States Patent
Bolyard, Jr.

(10) Patent No.: US 8,726,934 B2
(45) Date of Patent: May 20, 2014

(54) MULTI-MODE PRESSURE RELIEF VALVE

(75) Inventor: Edward W. Bolyard, Jr., Old Hickory, TN (US)

(73) Assignee: Illinois Tool Works Inc., Glenview, IL (US)

( * ) Notice: Subject to any disclaimer, the term of this patent is extended or adjusted under 35 U.S.C. 154(b) by 437 days.

(21) Appl. No.: 12/775,360

(22) Filed: May 6, 2010

(65) Prior Publication Data

US 2011/0272044 A1 Nov. 10, 2011

(51) Int. Cl.
*F16K 17/06* (2006.01)
*F16K 15/16* (2006.01)
*B05C 5/00* (2006.01)

(52) U.S. Cl.
USPC .............. 137/536; 137/529; 137/540; 251/83

(58) Field of Classification Search
USPC ............. 137/524, 536, 540, 495, 529; 251/83
See application file for complete search history.

(56) References Cited

U.S. PATENT DOCUMENTS

| | | | | |
|---|---|---|---|---|
| 1,623,431 A | * | 4/1927 | McVoy ........................ | 251/63.4 |
| 2,944,564 A | * | 7/1960 | Pettey, Jr. ....................... | 137/529 |
| 4,106,522 A | * | 8/1978 | Manesse ........................ | 137/512 |
| 4,501,291 A | * | 2/1985 | Siegrist ........................... | 137/529 |
| 5,234,028 A | * | 8/1993 | Takano et al. .................. | 137/529 |
| 5,692,537 A | * | 12/1997 | Arian et al. .................... | 137/486 |
| 5,833,210 A | * | 11/1998 | Sommer ........................ | 251/61.4 |
| 6,837,266 B2 | * | 1/2005 | Fredrickson et al. ........ | 137/529 |
| 6,986,362 B2 | * | 1/2006 | Cheong ........................ | 137/491 |
| 2004/0231732 A1 | | 11/2004 | Jeter et al. | |

FOREIGN PATENT DOCUMENTS

| | | |
|---|---|---|
| DE | 664962 C | 9/1938 |
| EP | 1479955 A2 | 11/2004 |
| FR | 1561787 A | 3/1969 |
| GB | 747667 A | 4/1956 |

OTHER PUBLICATIONS

International Search Report and the Written Opinion of the International Searching Authority issued on Aug. 9, 2011, in connection with PCT/US2011/031275.

* cited by examiner

*Primary Examiner* — John Rivell
(74) *Attorney, Agent, or Firm* — Levenfeld Pearlstein, LLC

(57) ABSTRACT

A multi-mode pressure relief valve includes a body having fluid inlet and outlet ports and a compressed gas inlet port. The fluid ports and gas port isolated from one another. A reciprocating piston is in communication with the gas port. A valve stem is movable between an open condition and a closed position to permit and stop flow communication between the fluid ports. A spring is disposed between the valve stem and the piston and urges the piston and valve stem away from one another. The valve is operable in at least three modes, an operating mode in which the valve is open, the stem is spaced from the piston, and the piston applies pressure on the stem, and in which the pressure is balanced by fluid pressure the inlet, a zero-state mode in which the valve is open, the stem is spaced from the piston, the spring is in a relaxed state, and the piston applies no pressure on the valve stem, and a relief mode in which the valve is open, the stem contacts or is in close proximity to the piston and the spring is in a compressed state due to the fluid pressure.

11 Claims, 3 Drawing Sheets

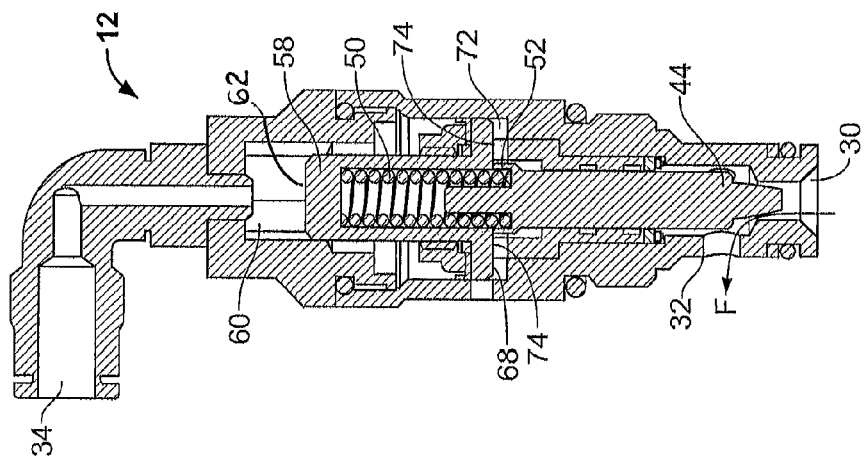
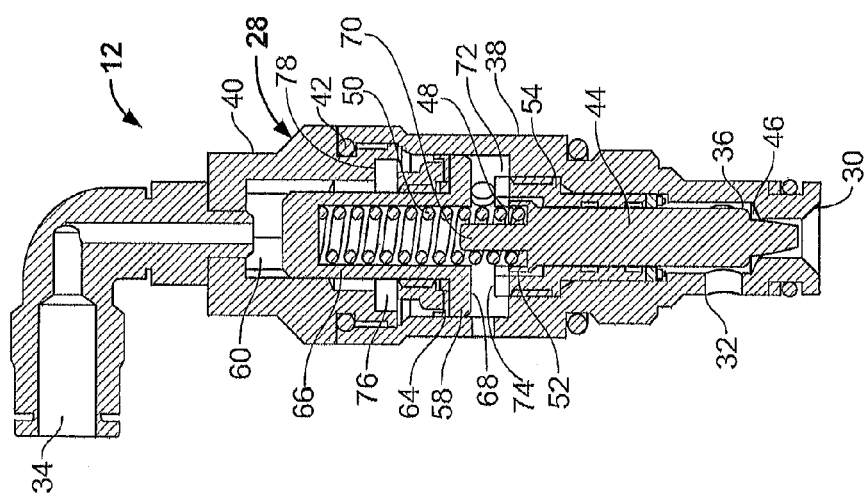

MULTI-MODE PRESSURE RELIEF VALVE

BACKGROUND OF THE INVENTION

The present invention relates to a multi-mode valve. More particularly, the present invention relates to a multi-mode pressure relief valve for use in pressurized hot-melt adhesive systems.

Pressurized hot-melt adhesive systems are in use in a multitude of production facilities, in countless industries. For example, these system are used to seal cartons and containers for commercial products ranging from soda-pop to breakfast cereals to tools and consumables.

In pressurized hot-melt systems a pressure relief valve is provided to protect against failure of the equipment in the event of an abnormally high pressure situation. Typically this protection is provided by a mechanical pressure relief valve that vents high pressure to the tank or reservoir that supplies the adhesive.

It is also desirable to have the ability to quickly reduce the pressure within the system to a zero-pressure condition (known as zero-state). This is desirable for maintenance of the system, for emergency-stop situations, or the like. A mechanical pressure relief is not suitable for this purpose. As such, a separate pneumatic actuated valve is often provided for this function. Pneumatic operation allows the valve to be quickly deenergized to reduce system pressure. This, however, requires the use of a pneumatic circuit, actuator and other components.

Further, in some installations it is desirable to have the ability to adjust the adhesive pressure curve to match production speed requirements. This function maybe provided by a separate mechanical adhesive bypass valve, and/or by adjusting the pump speed dynamically with the parent machine line speed.

While this method functions well, often the adhesive pressure cannot be reduced quickly enough during a parent machine line stop. The result is excessive glue application on the final products.

As will be understood, each of these functions requires the use of a separate valve. These individual components each require maintenance, testing and the like in order to assure that they function properly. In addition, there is an initial capital cost associated with each. And, if a single component requires repair (or maintenance), it can adversely affect operation, not only of the adhesive system but of the parent line operation.

Accordingly, there is a need to reduce the number of components (valves) needed to carry out the pressure relief, zero-state and line speed following functions in a holt-melt adhesive application system. Desirably, such a valve has minimal moving parts. More desirably, such a valve is controlled by the pneumatic circuit of the adhesive system in which it is installed.

BRIEF SUMMARY OF THE INVENTION

A multi-mode pressure relief valve carries out the pressure relief, zero-state and line speed following functions in a holt-melt adhesive application system. The valve has minimal moving parts and is preferably controlled by the pneumatic circuit of the adhesive system in which it is installed.

The valve has a body having a fluid inlet port and a fluid outlet port that define a fluid chamber. The body includes a seat at the fluid chamber between the inlet port and the outlet port. The body further includes a compressed gas inlet port and defines a compressed gas chamber in flow communication with the gas inlet port. The compressed gas chamber and the fluid chamber are isolated from one another.

A piston is disposed in the compressed gas chamber and is configured for reciprocating movement in the chamber. The piston has a spring receiving region.

A valve stem is movable within the fluid chamber between an open condition in which flow communication is established between the inlet port and the outlet port and a closed position to stop flow through the valve. The valve stem has a spring receiving region.

A spring, such as a coil spring, is disposed between the valve stem and the piston. The spring urges the piston into the compressed gas chamber toward the gas inlet and urges the valve stem into the fluid chamber to the closed position.

The valve is operable in at least three modes. In an operating mode, the valve is in the open condition, the valve stem is spaced from the piston, and the piston applies a pressure on the valve stem, through the spring. The piston pressure is balanced by fluid pressure exerting a force on the valve stem.

In a zero-state mode, the valve is in the open condition, the valve stem is spaced from the piston and the spring is in a relaxed state. The piston applies no pressure on the valve stem.

And, in a relief mode, the valve stem is in the open condition with the valve stem contacting or in close proximity to the piston. The spring is in a compressed state due to the fluid pressure of fluid entering the inlet exerting a force on the valve stem and gas pressure on the piston.

In a present valve, the piston has a piston face opposing the valve stem and the valve stem includes a shoulder portion for contacting the piston face when the valve is in the relief mode. The valve includes a piston stop surface that prevents the piston face from contacting the valve stem shoulder portion when in the operating mode and the zero state mode.

A stem guide is annularly disposed about the valve stem, positioned in the valve body. The piston stop surface is formed on the stem guide.

The valve can also operate in a maximum pressure mode, which is an operating state, in which the valve stem may be in the open condition, the valve stem is spaced from the piston, and the piston face rests on the piston stop surface. The piston applies a pressure on the valve stem through the spring and the valve stem shoulder portion is spaced from the piston face.

The valve body defines a space between the piston and the valve stem and the spring is disposed, at least in part in the space. The space is open to the environs to prevent influence from the compressed gas or the fluid on the valve operation or function. The piston can be cup-shaped, with the spring receiving region positioned in the cup.

The valve includes a valve seat in the fluid chamber between the fluid inlet port and the fluid outlet port. The stem engages the seat to close the valve.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 2 is a cross-sectional view of the valve in the neutral or operating condition;

FIG. 3 is a cross-sectional view of the valve in the maximum pressure relief condition;

DETAILED DESCRIPTION OF THE INVENTION

Figure 1:
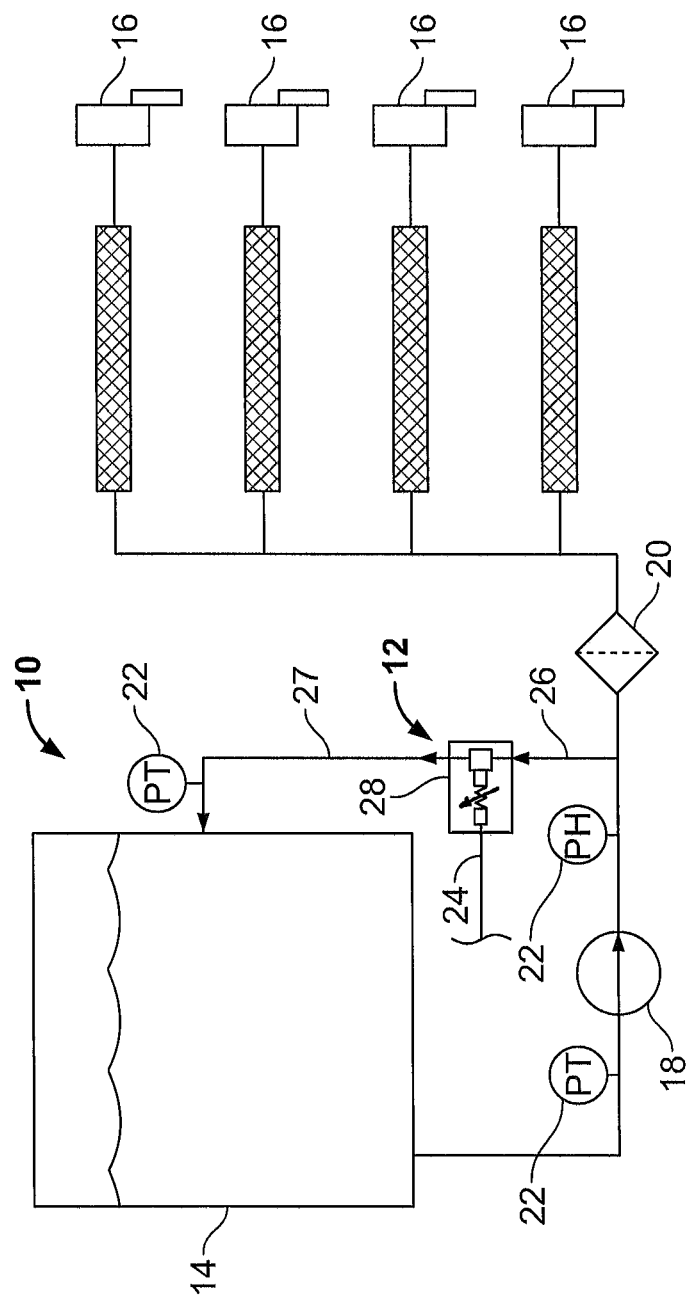
FIG. 1 is a schematic illustration of an adhesive system having a multi-mode pressure relief valve embodying the principles of the present invention.

While the present invention is susceptible of embodiment in various forms, there are shown in the drawings and will hereinafter be described several preferred embodiments with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent and Trademark Office, and does not imply, nor should be inferred to limit the subject matter disclosed herein.

Referring now to the figures and in particular to FIG. 1, there is shown a schematic illustration of a hot melt adhesive system 10 having a multi-mode pressure relief valve 12 in accordance with the principles of the present invention. The adhesive system 10 includes an adhesive supply, such at the illustrated tank 14, which contains a specified volume of adhesive maintained at a temperature that allows for transport or conveyance of the adhesive. In a typical operation, the tank temperature is maintained about 50° F. lower than the adhesive application temperature. A present system has the tank temperature maintained at about 300° F.

An adhesive dispenser head 16, four shown, heats the adhesive to an operating or application temperature (for example, about 350° F.) at which the adhesive is discharged onto the desired object. It will be appreciated that the object can be, for example, a carton or container for commercial products ranging from soda-pop to breakfast cereals to tools and consumables. The adhesive is dispensed at the desired temperature and at a desired flow rate to control the application of the adhesive to the object. The flow rate is determined so that the adhesive flows onto the object without affecting or slowing the production line speed, but is applied in a sufficient volume to effect the adhesive process.

A pump 18 supplies the adhesive to the applicator heads 16. In present systems, the adhesive is supplied at relatively high pressures, as high as 1000-1100 psi. A filter 20 can be provided to filter the adhesive prior to routing to the applicator heads 16, and various pressure and temperature monitors 22 can be provided in the system 10.

The overall operation of the production line (not shown) and the adhesive system 10 is carried out using a pneumatic control system, pneumatic supply being shown generally at 24. Such systems are sufficiently versatile to allow for controlling the valves needed for operation, as well the other components within the system. In certain production line systems, the pressure of the pneumatic system is used to control the overall production (packaging) operation. In these system, the speed of production is controlled by the pneumatic system 24 pressure.

The present multi-mode pressure relief valve 12, which is shown in the operating condition, is illustrated in FIG. 2. Referring briefly again to FIG. 1, the valve 12 is positioned in a branch line 26 along the adhesive flow path, between the pump 18 and the filter 20. In this manner, system 10 pressure is controlled by returning a portion or all of the fluid flow from the pump 18 back to the tank 12 through the discharge side branch line 27 from the valve 12.

Referring back to FIG. 2, the valve 12 includes a valve body 28 having an adhesive inlet port 30 and an adhesive outlet port 32. The inlet and outlet 30, 32 are shown in transverse relation to each other, but it will be appreciated by those skilled in the art that the configuration of the inlet 30 and outlet 32 can be varied. An adhesive flow path F is defined between the inlet 30 and outlet 32. The valve 12 also includes a compressed gas (air) inlet 34 isolated from the adhesive inlet 30 and outlet 32. The body 28 thus defines an adhesive chamber 36 between the adhesive inlet 30 and outlet 32. A present body 28 is formed as two parts—a main body 38 and a cap 40 that are threaded together, with a seal 42 between the parts.

A valve stem 44 is positioned in the body 28 to move into and out of the adhesive flow path F. A valve seat 46 is an annular element on which the stem 44 seats to permit or isolate the flow of adhesive. As seen in FIG. 2, when the stem 44 moves off of the seat 46, flow of adhesive is established between the inlet 30 and the outlet 32. The stem 44 includes an annular recess 48 in which a spring 50 (described below) resides and which defines an annular shoulder 52.

A stem guide 54 is positioned in the body 28 to guide the stem 44 as it moves between the open (FIG. 1) and closed (FIG. 3) positions. The guide 54 maintains the stem 44 positioned in the valve 12 and guides the stem 44 as it moves to open and close the valve 12. A stem seal 56 is positioned between the stem 44 and the guide 54 to prevent the flow of adhesive around the stem 44 and into the "clean" areas of the valve body 28. The seal 56 can be of the packed-type seal with a spring to assure good contact and isolation between the stem 44, the body 28 and guide 54.

The valve 12 includes a piston 58 in the body 28, opposite of the seat 46. The spring 50 positioned between the piston 58 and stem 44. A compressed gas (or air) chamber 60 is defined between the air inlet 34 and a top 62 of the piston 58. The piston 58 is positioned to move within the air chamber 60 toward and away from the valve stem 44. The piston 58 is an inverted U-shaped or cup-shaped reciprocating member and includes a seal 64 to prevent the leakage of air around the periphery of the piston 58. A region around the cup-shaped portion 66 defines a piston face 68.

The spring 50 is positioned between the stem 44 and the piston 58 and resides in the cup portion 66 of the piston 58. The spring 50 is held in place about the stem 44 by a post or finger 70 extending from the end of the stem 44, about which the spring 50 is positioned, and resides in the stem annular recess 48. Although the spring 50 is shown as a coil spring, those skilled in the art will appreciated that the spring can be of a number of different types, such as Belleville washers or the like and that such other constructions are within the scope and spirit of the present invention. A space 72 between the bottom of the piston 58 and the top of the valve stem 44 is open to the environs. In this manner, pressure either from the adhesive side (chamber 36) or air side (chamber 60) that may escape around their respective seals, does not adversely affect the operation of the valve, and does not influence the valve operation or function.

It will be appreciated from a study of the figures that the force exerted on the piston 58 from the air-side 60 pressure, in conjunction with the spring 50 force, counteracts or balances the force exerted on the valve stem 44 from the adhesive side 36 pressure. In a present valve 12, there is an adhesive-side 36 to air-side 60 pressure ratio of 14:1 at which the pressures are balanced. That is, for each 1 psi of air pressure the system provides 14 psi of adhesive pressure. The valve 12 ratio can, of course, be configured as desired for a particular adhesive system or control system.

Various other features of the valve have been included to achieve desired operating characteristics. As best seen in FIG. 2, the valve 12 includes a piston stop surface 74 on the stem guide 54. The stop surface 74 prevents over travel of the piston 58 (see FIGS. 3 and 5) in the event that air pressure is greater than a maximum setting and to prevent shut-off when the adhesive pressure is greater than a minimum threshold. It provides a physical stop for movement of the piston 58. Referring to FIG. 2, the valve 12 also includes a free clearance, indicated at 76, for zero-state operation (described in more detail below) relative to the normal or operating condition to allow the piston 58 to move fully up into the air chamber 60 (as seen in FIG. 4).

The valve 12 has at least three and preferably four operating conditions or states. FIG. 2 shows the valve 12 in a normal operating condition. Adhesive pressure is exerted on the stem 44 urging the valve 12 open, while air pressure is exerted on the piston 58, urging the piston 58 and spring 50 to close the valve 12 (stem 44). The air pressure and adhesive pressure are in balance and the valve 12 remains open to permit the flow of adhesive.

When it is desired to relieve the pressure in the adhesive system 10, as when the pump discharge pressure is too high, or for example, in a high pressure fault condition, the upward force on the valve stem 44 will urge the stem 44 up to open the valve 12, regardless of the air pressure in the system 10. This pressure relief condition is shown in FIG. 3, in which the piston 58 is shown at maximum air pressure, but the force on the stem 44 and spring 50) urges the valve 12 open nevertheless. Even with the high air pressure, it can be seen that the piston stop surface 74 prevents over-travel of the piston 58 and allows the stem 44 to rise and the valve 12 to open. In this condition, the annular shoulder 52 is in contact with the piston face 68 and the valve 12 is open even though the piston 58 is at a maximum downward position. That is, even with the piston 58 subjected to maximum air-side 60 pressure, there is sufficient, physical space between the annular shoulder 52 and the piston face 68 to allow the stem 44 to rise (until the shoulder 52 contacts the face 68) to relieve system 10 pressure.

Figure 4:
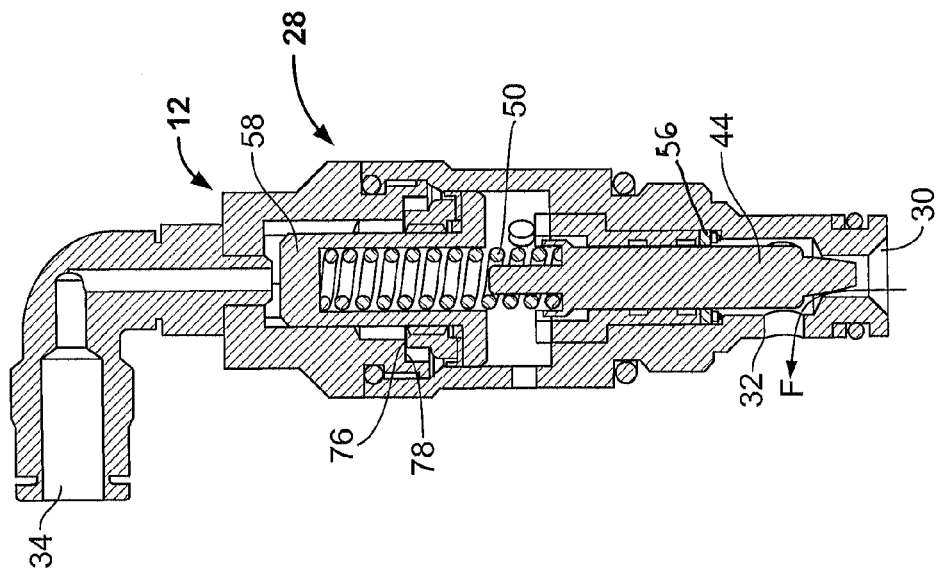
FIG. 4 is a cross-sectional view of the valve in the zero-state condition.

When it is desired to de-pressurize the adhesive system 10 (to dump system pressure, for example, for system 10 maintenance), the valve 12 is in the zero-state condition as seen in FIG. 4. Here, the air pressure is reduced to or close to zero, and the piston 58 moves fully up in the body 28 toward the air inlet 34. In this condition, the piston 58 moves into the free clearance or zero-state condition space 76 and rests against an upper piston stop 78 in the valve body 28. Thus, the stem 44 likewise moves up against a reduced spring 50 force to open the valve 12 and drops or dumps the pressure in the adhesive supply system 10.

Figure 5:
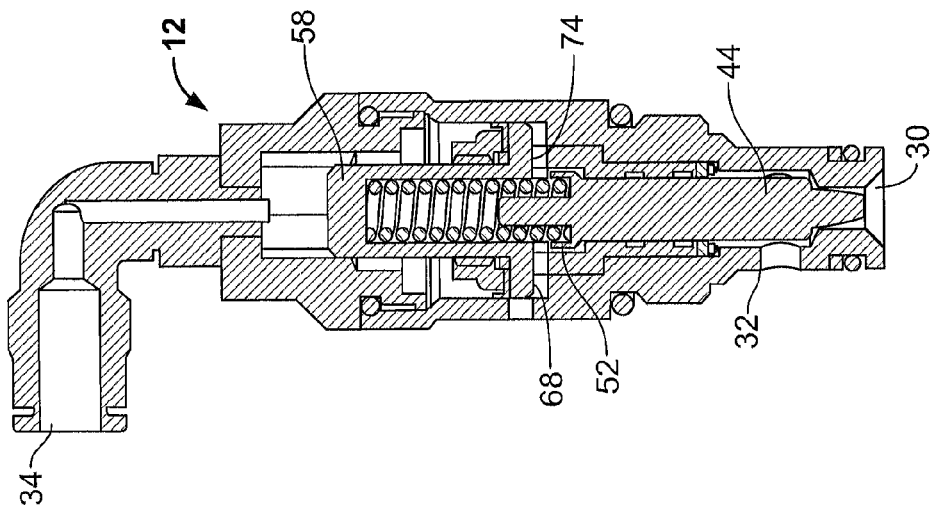
FIG. 5 is a cross-sectional view of the valve in the maximum pressure condition.

A last operating condition is shown in FIG. 5 which illustrates a maximum operating condition. Here, the air supply pressure is at a maximum with the piston 58 resting on the stop surface 74, and with the stem 44 being urged upward to open the valve 12 by fluid pressure on the stem 44. The stem 44 is spaced from the piston 58 (that is, there is no contact between the stem annular shoulder 52 and the piston face 68) and thus the stem 44 can move, as by adhesive pressure, up toward the piston 58 to allow adhesive flow, and/or to prevent over-pressurization with the stem 44 moving up, against the piston face 68, into the pressure relief condition.

As set forth above, the present multi-mode valve 12 replaces three presently used valves, namely a pressure relief valve, a zero-state device (valve) and a line speed following valve. The present multi-mode valve 12 performs all three functions. That is, the zero-state condition is provided by isolating air flow to the valve 12, and thus allowing the valve 12 to go to full open; pressure relief is provided by allowing pressure against the stem 44, to open the valve 12, regardless of the air-side pressure 60 acting on the piston 58; and, line speed following is provided in the normal operating to maximum pressure conditions, by a balance of the air-side 60 pressure acting on the piston 58 and the counter-balancing adhesive-side 36 pressure acting on the valve stem 44. Moreover, the present valve 12 advantageously provides these operating and safety modes in a single compact component with a minimum number of moving parts.

In the present disclosure, the words "a" or "an" are to be taken to include both the singular and the plural. Conversely, any reference to plural items shall, where appropriate, include the singular. All patents referred to herein, are hereby incorporated herein by reference, whether or not specifically done so within the text of this disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:
1. A multi-mode pressure relief valve, comprising:
a body having a fluid inlet port and a fluid outlet port defining a fluid chamber therebetween, the body including a seat at the fluid chamber between the inlet port and the outlet port, the body further having a compressed gas inlet port and defining a compressed gas chamber in flow communication with the compressed gas inlet port, the compressed gas chamber and the fluid chamber being isolated from one another;
a piston disposed in the compressed gas chamber, the piston configured for reciprocating movement in the compressed gas chamber, the piston having a spring receiving, region and a piston face disposed radially around the spring receiving region;
a valve stem, the valve stem movable within the fluid chamber between an open condition in which flow communication is established between the inlet port and the outlet port and a closed position in which flow communication is isolated between the inlet port and the outlet port, the valve stem having a spring receiving region and a shoulder portion;
one and only one spring, the spring disposed between the valve stem and the piston, the spring urging the piston into the compressed gas chamber and urging the valve stem into the fluid chamber to the closed position; and
a stem guide annularly disposed about the valve stem and positioned in the valve body, the stem guide including a piston stop surface;
wherein the valve is operable in at least three modes,
an operating mode in which the valve stem is in the open condition, the valve stem is spaced from the piston, and the piston applies a pressure on the valve stem, through the spring, the pressure being balanced by a fluid pressure of fluid entering the inlet exerting a force on the valve stem,
a zero-state mode in which the valve stem is in the open condition, the valve stem is spaced from the piston, the spring is in a relaxed state, and the piston applies no pressure on the valve stem, and a relief mode in which the valve stem is in the open condition, the valve stem contacting or in close proximity to the piston the valve stem shoulder portion contacting the piston face, and the spring in a compressed state due to the fluid pressure of fluid, entering the inlet exerting a force on the valve stem, and wherein a space is defined between a portion of the body, the stem guide, the valve stem and the piston, the spring disposed at least in part in the space, and wherein the space is open to the environs, extends circumferentially about the valve stem and is maintained by contact between the piston stop surface and the piston in the relief mode.

2. The pressure relief valve in accordance with claim 1, wherein the piston stop surface prevents the piston face from contacting the valve stem shoulder portion when in the operating mode and the zero state mode.

3. The pressure relief valve in accordance with claim 2 including a maximum pressure mode in which the valve stem may be in the open condition, the valve stem is spaced from the piston, and the piston face rests on the piston stop surface, the piston applying a pressure on the valve stem through the spring, the valve stem shoulder portion being spaced from the piston face.

4. The pressure relief valve in accordance with claim 1 wherein the spring is a coil spring.

5. The pressure relief valve in accordance with claim 1 wherein the piston is cop-shaped, defining a cup, and wherein the spring receiving region is positioned in the cup.

6. The pressure relief valve in accordance with claim 1 including an upper piston stop surface.

7. The pressure relief valve in accordance with claim 1 including a valve seat in the fluid chamber between the fluid inlet port and the fluid outlet port, the valve seat engageable with the valve stem to establish the valve closed position.

8. A multi-mode pressure relief valve, comprising:

a body having a fluid inlet port and a fluid outlet port defining a fluid chamber therebetween, the body further having a compressed gas inlet port and defining a compressed gas chamber in flow communication with the compressed gas inlet port, the body defining a space between the compressed gas chamber and the fluid chamber being open to the environs;

a piston disposed in the compressed gas chamber for reciprocating movement;

a valve stem movable within the fluid chamber between an open condition in which flow communication is established between the inlet port and the outlet port and a closed position in which flow communication is isolated between the inlet port and the outlet port;

one and only one spring, the spring operably connected to the valve stem and the piston and biasing the piston and the valve stem away from one another; and a stem guide positioned annularly about the stem, the stem guide having a piston stop surface formed thereon;

wherein pressure applied by the fluid on the valve stem, in conjunction with the spring counteracts pressure applied by the compressed gas on the piston to effect at least three valve operating modes, an operating mode in which the valve stem is in the open condition, spaced from the piston, and the piston applies a pressure on the valve stem, through the spring, the pressure being balanced by a fluid pressure of fluid entering the inlet exerting a force on the valve stem, a zero-state mode in which the valve stem is in the open condition, spaced from the piston, the spring is in a relaxed state, and the piston applies no pressure on the valve stem, and a relief mode in which the valve stem is in the open condition, the valve stem contacting or in close proximity to the piston with the spring in a compressed state, and wherein the space is maintained by the piston stop surface contacting the piston in the relief mode.

9. The valve in accordance with claim 8 wherein the piston stop surface prevents over-movement of the piston toward the valve stem.

10. The valve in accordance with claim 9 wherein the valve stem includes a shoulder engageable with the piston when the valve is in the relief mode.

11. The valve in accordance with claim 8 wherein the piston is captured within the body and is movable between an upper stop surface and a lower stop surface, the piston positioned between the upper and lower stop surfaces in the operating mode, positioned at about or on the upper stop surface in the zero-state mode and at about or on the lower stop surface in the relief mode.

* * * * *

UNITED STATES PATENT AND TRADEMARK OFFICE
CERTIFICATE OF CORRECTION

| | | |
|---|---|---|
| PATENT NO. | : 8,726,934 B2 | Page 1 of 1 |
| APPLICATION NO. | : 12/775360 | |
| DATED | : May 20, 2014 | |
| INVENTOR(S) | : Edward W. Bolyard | |

It is certified that error appears in the above-identified patent and that said Letters Patent is hereby corrected as shown below:

In the Specification

Column 5, line 32, "and" to read as --(and--.

Column 5, line 40, "sufficient," to read as --sufficient--.

Column 5, line 41, "stern" to read as --stem--.

In the Claims

Column 6, lines 42-43, Claim 1, "receiving, region" to read as --receiving region--.

Column 7, line 7, Claim 1, "fluid, entering" to read as --fluid entering--.

Column 8, line 14, Claim 8, "spring" to read as --spring,--.

Signed and Sealed this
Twenty-fourth Day of February, 2015

Michelle K. Lee
*Deputy Director of the United States Patent and Trademark Office*